Feb. 10, 1959  J. C. OWEN  2,873,418
SERVOSYSTEM PITCH CONTROL FOR AIRCRAFT
Filed Sept. 22, 1955
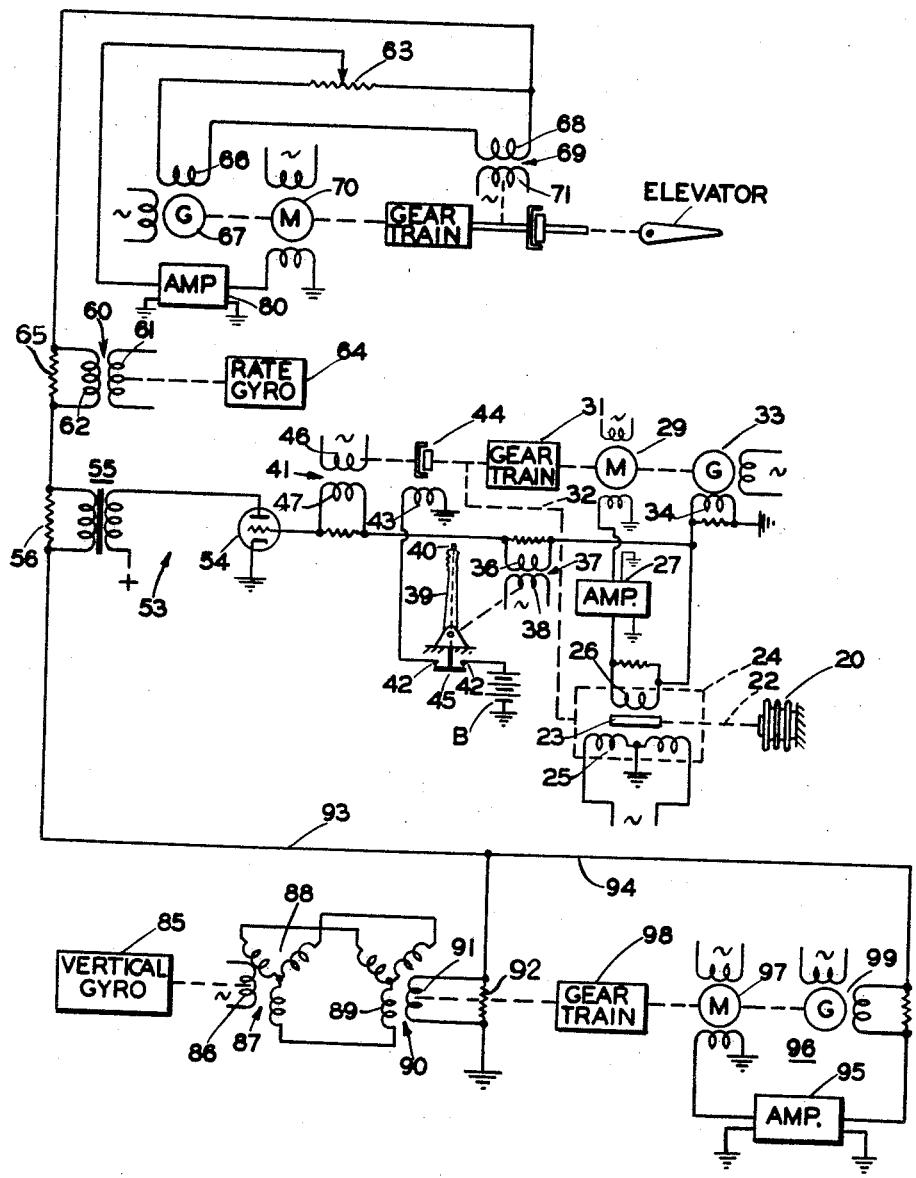
INVENTOR.
JOHN C. OWEN
BY
Oscar B. Brumback
ATTORNEY

2,873,418
Patented Feb. 10, 1959

2,873,418

SERVOSYSTEM PITCH CONTROL FOR AIRCRAFT

John C. Owen, Grand Rapids, Mich., assignor to Bendix Aviation Corporation, Teterboro, N. J., a corporation of Delaware Application September 22, 1955, Serial No. 535,858

13 Claims. (Cl. 318—489)

This invention relates generally to automatic control systems for aircraft and, more particularly, to a control system for the pitch control channel of an aircraft.

In general, an automatic control system for aircraft detects deviations in the condition of the aircraft with respect to a predetermined condition and applies a control action to the craft to correct for the deviation. Conventional practice has been to control the pitch condition of a craft on the basis of the deviations detected from a predetermined pitch attitude, the elevator surfaces being moved in response to the deviation to return the craft to the desired attitude. This control may be supplemented in some cases by detecting the rate of attitude displacement and moving the surfaces to reduce the rate to zero.

An object of the present invention is to provide a novel system for controlling an aircraft on the basis of the rate of climb or dive of the craft.

Another object of the present invention is to provide a novel system for controlling an aircraft on the basis of the rate of climb or dive of the craft supplemented for short periods of time on the basis of pitch attitude.

Another object is to provide a novel aircraft control system in which changes in pitch are commanded as changes in rate of climb or dive.

Another object is to provide a novel automatic control system for maintaining an aircraft in level flight as a function of rate of climb or dive, deviation from a predetermined altitude, and transient changes in pitch attitude.

Another object is to provide a novel aircraft control system in which an attitude signal is effective on the system only for short periods of time.

The present invention contemplates a novel control system for maintaining an aircraft in a commanded rate of climb or dive including means for detecting deviation from the commanded rate and applying a control action to the craft to correct for the deviation, the change in attitude of the craft also being detected and used for short periods of time to stabilize the control action during a finite rate of climb or dive and the deviation in altitude from a predetermined altitude being used in addition when a rate of climb commanded is zero.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

The single figure of drawing illustrates schematically an aircraft pitch control system made in accordance with the present invention.

As illustrated in the drawing, the final control signal for the pitch control channel comprises the summation of signals; one signal corresponding to the difference between the measured and the commanded rate of climb or dive, another signal corresponding to the rate of turn about the pitch axis, a follow-up signal corresponding to the displacement of the control surface from a normal position, a signal corresponding to the rate of servomotor operation signal, a signal of short duration corresponding to the change in pitch attitude, and, at times, a signal corresponding to the deviation from a predetermined altitude.

A conventional aneroid 20 is used to measure the climb and dive of the craft. In response to change in altitude, the expansion and contraction of the aneroid moves a suitable connecting rod 22 which displaces the core 23 of a transformer 24 having primary windings 25 and a secondary winding 26. As long as the transformer is balanced, no signal is developed at secondary winding 26, even though the primary windings 25 are energized. A displacement of core 23 due to the movement of aneroid 20 upsets this balanced condition to develop at secondary winding 26 a signal corresponding in amplitude and phase to the extent and direction of unbalance or displacement. This signal is applied to a nulling system comprising an amplifier 27 which discriminates the phase of the signal and raises it to a level sufficient to operate a conventional induction motor 29. Through a suitable gear train 31 and a mechanical connection 32, motor 29 returns transformer 24 to a new balanced position, and at the same time turns the rotor of a rate generator 33 to develop at winding 34 a signal corresponding in phase and amplitude to the direction and rate of motor operation.

Since the operation of motor 29 maintains transformer 24 in a balanced condition, the rate of motor operation corresponds to the rate of movement of core 23. The signal developed by rate generator 33 corresponds to the rate of motor operation. Thus, the signal from winding 34 of rate generator 33 corresponds in amplitude and phase to the rate of climb or dive of the aircraft.

Connected to winding 34 in parallel with the nulling system is the stator 36 of an inductive device 37 in one branch of a signal chain for the elevator servomotor. The rotor 38 of this inductive device is normally at a null condition. Rotor 38 may be displaced, however, by a manual controller 39. Normally controller 39 is locked in a center position, and a plunger 40 must be depressed to release the controller. The displacement of rotor 38 corresponds to an ordered rate of climb or dive and the signal represented by the combined signals of winding 34 and 36 corresponds to the error or difference between the commanded and the measured rate of climb.

Thus, upon the signal voltage induced in the winding 36 exceeding that in the winding 34, the resultant signal would call for an additional adjustment of the elevator by the motor 70 to increase the rate of climb or dive of the aircraft. The aneroid 20, in response to such increase, would thereupon increase the rate of adjustment to the core 23 and, in turn, motor 29. The latter action would cause the generator 33 to increase the signal voltage applied across the winding 34 so as to tend to balance the signal voltage applied across winding 36 corresponding to the set rate of climb or dive determined by the adjustment of the controller 39. Of course, deviations from the selected rate of climb or dive would cause an adjustment of the elevator by the motor 70 so as to tend to cause the signal voltage at winding 34 to balance that applied to winding 36 under the commanded rate of climb or dive operating conditions.

It will be appreciated that a zero commanded rate of climb represents a constant altitude condition of the craft regardless of whether the craft is in a level attitude, a nose-up attitude, or a nose-down attitude. The zero rate of climb signal is supplemented by an altitude deviation signal from an inductive device 41.

When manual controller 39 is centered, a zero rate of climb is commanded; contacts 42 are bridged by member 45 to energize coil 43 of magnetic clutch 44 so that the faces of the clutch are engaged. Thereafter, any deviation of the aircraft from this altitude displaces rotor 46 relative to the stator 47 of inductive device 41 to develop a signal corresponding in phase and amplitude to the direction and extent of deviation of the craft from the engaged altitude. The combined signals are applied through a conventional isolation and coupling stage 53 comprised of a triode 54 and transformer 55 having a secondary winding connected across a resistor 56 in another section of the signal chain.

The signal on resistor 56 is combined with a signal from an inductive device 60 whose rotor 61 is displaced relative to stator 62 by conventional rate of turn gyro 64 to develop at stator 62 a signal corresponding in phase and amplitude to the direction and rate of turning of the craft about the pitch axis. Stator 62 is connected across a resistor 65.

Connected across potentiometer 63 is the winding 66 of a rate generator 67 and the stator 68 of an inductive device 69. Servomotor 70 drives the rotor of rate generator 67 as it displaces the elevator surface to develop at winding 66 a signal corresponding in phase and amplitude to the direction and rate of motor operation. Motor 70 also displaces rotor 71 of inductive device 69 relative to stator 68 to develop at stator 68 a signal corresponding in amplitude and phase to the extent and direction of surface displacement. These signals are combined at potentiometer 63 and applied to a conventional discriminator type amplifier 80 whose output operates servomotor 70.

A conventional vertical gyro 85 is utilized to provide a stabilization signal which is cancelled after a period of time. To this end, the pitch axis trunnion of vertical gyro 85 is connected in a known manner to the rotor 86 of a transmitter inductive device 87 whose stator 88 is connected to the stator 89 of a receiver inductive device 90 whose rotor 91 is connected across a resistor 92 and in turn to resistor 56 of isolation station 53 by way of lead 93 and by way of lead 94 to an amplifier 95 of a cancelling system 96. The output of amplifier 95 operates a motor 97 to drive rotor 91 through a suitable gear train 98 into positional agreement with rotor 86. However, due to the degenerative output of a conventional rate generator 99 driven by the motor, the motor operates at a rate determined by the amplitude of the signal from rotor 91.

When manual control column 39 is centered, a zero rate of climb is ordered. Contacts 42 are bridged so that coil 43 is energized from battery B and clutch faces 44 are engaged. Thus, motor 29 is drivingly coupled to the rotor 46 of inductive device 41. Thereafter, any deviation of the craft from this altitude, due to gusts or other disturbances, causes an explosion or contraction of aneroid 20 moving core 23 to unbalance transformer 24. The signal developed at winding 26 of transformer 24 is applied to amplifier 27 and operates motor 29 to return the transformer to a balanced condition. At the same time, motor 29 drives a rate generator 33 to develop at winding 34 a rate of climb or dive signal and displaces rotor winding 46 relative to stator 47 to develop a signal corresponding to the extent of altitude deviation. The rate and altitude deviation signals operate motor 70 to displace the elevator surface to return the craft to a zero rate of climb and to the predetermined altitude. As the displaced surface causes the craft to turn about the pitch axis, gyro 64 responds to the movement of the craft to displace rotor 61 relative to stator 62 to develop at stator 62 a signal corresponding in phase and amplitude to the direction and extent of craft movement to oppose the movement. Thus, the signal from the rate gyro tends to clamp the action of the craft about the pitch axis.

Any displacement of the craft in pitch from level pitch attitude causes a movement of rotor 86 relative to rotor 91 to develop at rotor 91 a corresponding signal. This signal opposes the operation of motor 70 by the rate of climb and altitude displacement signals and also operates motor 97 to drive rotor 91 to a new null.

Due to the high output value of rate generator 99, motor 97 cannot effectively respond to short period displacements of the craft, the generator output being degeneratively coupled to the amplifier 95 and being a signal corresponding in phase and amplitude to the direction and rate of motor operation. Thus, as a signal input to amplifier 95 operates motor 97 to position rotor 91 to cancel the signal, the operation of the motor also causes a signal to develop at generator 99 so that when the motor begins to move at a rate proportional to the signal from rotor 91, the output from the rate generator 99 and inductive device 90 cancel. The rate at which the motor operates to cancel the input and therefore the time required to cancel a given input is controlled by rate generator 99 so that the motor slowly positions rotor 91, the rate depending upon the magnitude of the signal from rotor 91. For transient conditions of the craft, the signal will be varying rapidly and the cancellation will be slight because of the high value of the output of generator 99 whose rotor is moving rapidly.

A fore and aft movement of manual controller 39 calls for a rate of climb or dive of the craft proportional to the extent of movement. Depressing plunger 40 to release the controller for movement also opens the circuit from battery B and deenergizes coil 43. This disengages clutch 44 so that the motor 29 can no longer drive the rotor 46 of inductive device 41. The command signal resulting from the relative displacement of rotor 38 and stator 36 by controller 39 operates motor 70 to displace the elevator surfaces until the follow-up signal from inductive device 69 becomes equal and opposite to the command signal. The net input to amplifier 80 is zero at that time so the motor stops with the surfaces displaced.

The displaced surface can change the pitch attitude of a craft at a rate greater than the rate at which the climb or dive of the craft can be changed. As the pitch attitude changes, the commanded rate of climb signal is first opposed by the pitch attitude signal from rotor 91; the follow-up signal returning the surface to normal position as these two signals balance. The pitch attitude signal is degenerated as the attitude signal operates motor 97, but the craft has changed its rate of climb or dive by that time so that the measured rate of climb signal can oppose the commanded rate of climb signal.

The foregoing has presented a novel automatic pilot system in which a rate of climb or dive of the craft is the reference standard and, when a zero rate of climb is ordered, the reference is supplemented by an altitude reference from which deviations are measured to maintain a constant altitude condition. When a finite rate of climb is commanded, the commanded rate of climb is balanced by the pitch attitude signal which degenerates as a period of time so that as the craft assumes a new rate of climb, the ordered rate of climb signal will be balanced by the measured rate of climb signal. The pitch attitude reference, however, also supplies signals for transient changes from the new attitude of the craft.

Although only one embodiment of the invention has been illustrated and described in detail, it is to be expressly understood that the invention is not limited thereto. Various changes can be made in the design and arrangement of the parts without departing from the spirit and scope of the invention as will now be understood by those skilled in the art.

What is claimed:

1. A control system for an aircraft comprising means for developing an electrical signal corresponding to a measured rate of climb or dive, means for developing an electrical signal corresponding to a commanded rate of climb or dive, power means for changing the pitch attitude of said craft, means combining said signals to provide a resultant signal for controlling said power means, whereby said resultant signal corresponds to the error between the measured rate of climb or drive and commanded rates of climb or dive and controls said power means to change the pitch attitude of said craft to reduce said signal to zero, and means for developing a pitch attitude signal to oppose said resultant signal including means for slowly reducing said last-mentioned pitch attitude signal to zero.

2. A control system for an aircraft comprising power means, control means for said power means including a plurality of signal devices, means for actuating one of said signal devices to develop a signal corresponding to a measured rate of climb or dive, means for actuating a second of said signal devices to develop a signal corresponding to a commanded rate of climb or dive, means combining said signals to provide a signal which corresponds to the error between the measured rate of climb or drive and commanded rates of climb or dive, means for actuating a third of said signal devices to develop a pitch attitude signal to oppose said error signal, and means for slowly reducing said attitude signal to zero, whereby said power means is operated by said error signal and said attitude signal until said attitude signal becomes zero.

3. A control system for an aircraft comprising means for developing a signal corresponding to the error between a measured rate of climb and a commanded rate of climb, aircraft control means operated by said signal for changing the attitude of the craft to cause said error to become zero, means responsive to a change in pitch attitude of said aircraft of a greater rate than the change in said rate of climb, and means operated by said change in pitch attitude responsive means for providing a degenerating signal to said control means for opposing the rate of change in pitch attitude.

4. In an automatic control system for an aircraft, means for developing a signal corresponding to the error between a measured rate of climb and a commanded rate of climb, aircraft control means operated by said signal for changing the attitude of the craft to cause said error to become zero, means responsive to a change in pitch attitude of said aircraft of a greater rate than the change in said rate of climb, and means operated by said change in pitch attitude responsive means for providing a degenerating signal to said control means for decreasing the rate of change in pitch attitude including a vertical gyro, a motor, transmitter and receiver signal devices having a rotor positioned by said gyro and a rotor positioned by said motor, said last named degenerating signal being developed by said transmitter and receiver devices upon a relative movement of said rotors from a null position, and means operating said motor at a rate dependent upon the magnitude of said last named signal to reduce the latter to zero.

5. A control system for an aircraft having a surface movable to regulate the pitch attitude of said craft, comprising means for developing a first signal corresponding to the rate of climb of the craft, means for developing a second signal corresponding to a commanded rate of climb, means for developing a third signal corresponding to a change in pitch attitude, power means for moving said surface, a circuit connecting said first, second and third signal developing means to said power means to actuate the latter to move said surface to place said craft in an attitude to cause the measured and commanded rates of climb to agree, and said third signal means including a means degeneratively in circuit therewith and responsive to a sustained third signal for nullifying the latter.

6. A control system for an aircraft having a movable surface for regulating the rate of climb of the craft, comprising reference means for developing a first signal corresponding to the rate of climb of the craft, command means for developing a second signal corresponding to a commanded rate of climb, attitude responsive means for developing a third signal corresponding to a change in pitch attitude, and power means controlled by said signals for moving said surface to place said craft in an attitude to cause the measured and commanded rates of climb to agree, and said attitude responsive means including a means responsive to a steady state third signal for nullifying the latter.

7. In a control system for an aircraft, means for developing a signal corresponding to the error between a measured rate of climb and a commanded rate of climb, means for developing a signal corresponding to an error between a measured pitch attitude and commanded pitch attitude, power means under the control of both of said signals for changing the pitch attitude of said craft, and additional means under the control of said last named signal for reducing the latter signal to zero.

8. A control system for an aircraft comprising primary means for developing a signal corresponding to the error between a measured rate of climb and a commanded rate of climb, secondary reference means for developing a signal corresponding to a change in pitch attitude, power means under the control of said signals for changing the pitch attitude of said craft to reduce said first named signal to zero, and means responsive to said last named signal for reducing the latter signal to zero after the craft assumes a new attitude.

9. A control system for an aircraft comprising means for developing a signal corresponding to a change in pitch attitude of the aircraft from a datum attitude, power means under the control of said signal, means operated by said power means for returning said craft to an attitude to reduce said signal to zero, and motor means also under the control of said signal for actuating said first-mentioned signal developing means to reduce said attitude signal to zero whereby said datum attitude is changed.

10. A control system for an aircraft comprising means for developing a signal corresponding to the error between the measured rate of climb of the craft and commanded rate of climb of the craft, means operable under the control of said signal for changing the pitch attitude of the craft to reduce said error to become zero, and means for developing a signal to oppose the operation of said last named means including a signal device having two relatively displaceable parts for developing a signal corresponding to the relative displacement of said parts, attitude responsive means for positioning one of said parts, motor means responsive to said last named signal for positioning the other of said parts to reduce said signal to zero, and means operable for making the rate of operation of said motor means correspond to the magnitude of said signal.

11. An aircraft control system comprising means responsive to rate of climb of the aircraft for generating a signal voltage corresponding in sense and magnitude to the direction and extent of departure of said craft from a set change in pitch attitude signal, means for generating a signal corresponding in sense and magnitude to the direction and extent of departure of said craft from a datum attitude, means responsive to said last named signal for slowly changing said datum attitude whereby said last named signal tends to become zero, and means under the control of said signals for changing the attitude of said craft to reduce said first named signal to zero.

12. An automatic control system for an aircraft comprising rate of climb or dive responsive means for developing a signal corresponding to the rate of climb or dive of the craft, altitude responsive means for developing a signal corresponding to departure of the craft from a predetermined altitude, means for developing a signal corresponding to the departure of a craft from a datum attitude, command means for developing a signal to command a change in pitch attitude of the craft, and means interconnecting said command means and said altitude responsive means for rendering the latter effective when a zero change in pitch attitude is commanded and ineffective when a finite change in the pitch attitude of the craft is commanded.

13. In an automatic control system for an aircraft, means for developing a signal corresponding to the actual rate of climb or dive of the craft, means for developing a signal corresponding to departure of the craft from a predetermined altitude, means for developing a signal corresponding to the departure of a craft from a datum attitude, controller means operable for commanding a signal corresponding to a change in the pitch attitude of the craft, and interconnection means between said controller and said altitude means for rendering said altitude means effective when a zero change in the pitch attitude is commanded and for rendering said altitude means ineffective when a finite change in the pitch attitude of the aircraft is commanded.

References Cited in the file of this patent

UNITED STATES PATENTS 2,415,429 Kellogg _____ Feb. 11, 1947

UNITED STATES PATENT OFFICE
CERTIFICATE OF CORRECTION

Patent No. 2,873,418 February 10, 1959

John C. Owen

It is hereby certified that error appears in the printed specification of the above numbered patent requiring correction and that the said Letters Patent should read as corrected below.

Column 5, lines 12 and 28, for "drive", each occurrence, read -- dive --.

Signed and sealed this 26th day of May 1959.

(SEAL)
Attest:

KARL H. AXLINE
Attesting Officer

ROBERT C. WATSON
Commissioner of Patents